United States Patent Office 3,133,955
Patented May 19, 1964

3,133,955
2,2'-DITHIO-BIS-ISOBUTYRONITRILE
Douglas I. Relyea, Pompton Plains, N.J., assignor to United States Rubber Company, New York, N.Y., a corporation of New Jersey
No Drawing. Filed May 20, 1960, Ser. No. 30,420
2 Claims. (Cl. 260—465.8)

This invention relates to a new chemical, denoted 2,2'-dithio-bis-isobutyronitrile, and to the method of preparing same. In addition, the invention relates to the use of this novel compound as an accelerating and vulcanizing agent for rubbers.

The subject compound, 2,2'-dithio-bis-isobutyronitrile, is represented by the formula:

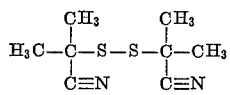

According to the invention, said 2,2'-dithio-bis-isobutyronitrile can be prepared by the interaction of elemental sulfur with 2,2'-azo-bis-isobutyronitrile in an inert solvent. The reaction may be illustrated as follows:

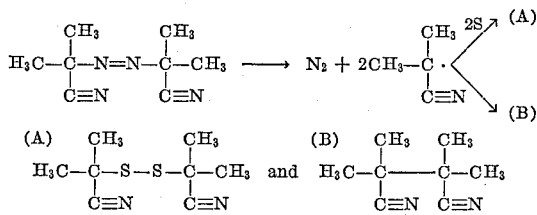

Denoting the free radical $(CH_3)_2$—C—C≡N in the above reaction as R·, the invention represents a reaction in which a free radical R· has reacted with sulfur to give a compound of the type RSSR.

The compound of this invention, 2,2'-dithio-bis-isobutyronitrile, may be used as a vulcanizing agent for highly unsaturated synthetic rubbers, for example, styrene-butadiene and acrylonitrile-butadiene copolymer rubbers. I have found from 0.5 to 5 parts by weight, and preferably from 1 to 3 parts by weight, of the subject compound per 100 parts of copolymer rubber to be sufficient for the purposes of this invention. It may be used alone or conjointly with other vulcanizing agents, particularly with the monomaleimide and bis-maleimide types of vulcanizing agents. In addition to its own vulcanizing action, the subject compound appears to have an accelerating effect when used conjointly with other vulcanizing agents.

Examples of the mono-maleimide type of vulcanizing agent are maleimide, N-phenylmaleimide, N-isopropylmaleimide, N-ethylmaleimide, N-3-chlorophenylmaleimide and N-1-naphthylmaleimide. Examples of the bis-maleimide type of vulcanizing agent are N,N'-ethylene-bis-maleimide, N,N'-m-phenylene-bis-maleimide, N,N'-p-phenylene-bis-maleimide, 2,6-bis-(maleimidomethyl)-4-t-butyl phenol, and N,N'-(2,4-tolylene)-dimaleimide.

The following examples illustrate the invention. All parts are by weight.

Example 1

In a 5-liter flask fitted with Glas-Col mantle, thermometer and reflux condenser, are placed 128 parts of sulfur and 2000 parts of benzene. The mixture is brought to reflux, about 80° C., and the clear yellow solution so formed is treated with 82 parts of 2,2'-azo-bis-isobutyronitrile. Additional 82-part quantities of the 2,2'-azo-bis-isobutyronitrile are added after 2, 4, 6, 8 and 10 hours of reflux. Reflux is then continued for an additional twelve hours. Most of the benzene is then removed by distillation, leaving a yellow paste. This residue is washed with three 450-part portions of ether to separate the organic products from about 42 parts of unreacted sulfur. By evaporating the combined ether washings to about two-thirds initial volume and chilling, there is obtained 143 parts of tetramethylsuccinonitrile, M.P. 165–169° C. Further evaporation of ether and replacement in part with pentane allows the fractional crystallization of another 32 parts of tetramethylsuccinonitrile and 50 parts of pure 2,2'-dithio-bis-isobutyronitrile, M.P. 62–63° C.

Analysis.—$C_8H_{12}N_2S_2$:

|   | Calculated, percent | Found, percent |
|---|---|---|
| C | 47.96 | 48.11 |
| H | 6.04 | 5.85 |
| N | 13.98 | 13.87 |
| S | 32.02 | 32.22 |

The use of benzene is not critical. Other inert organic liquids, e.g., chlorobenzene and ortho-dichloro-benzene, also can be used. Suitable liquids are characterized as being substantially unable to undergo free radical formation themselves under the conditions of the subject reaction. Solvents undergoing such formation, such as toluene and aliphatic ethers, interfere with the subject reaction and thus would be unsuitable for the purposes of this invention. Depending upon the solvent selected, the temperature of the reaction may be as high as the corresponding reflux temperature of the reaction solution. The preferred temperatures for the reaction are in the range from 50° to 100° C.

Example 2

This example demonstrates the efficacy of 2,2'-dithio-bis-isobutyronitrile as a vulcanizing agent. A styrene-butadiene copolymer rubber with a styrene content of about 20 percent (SBR–1502) was compounded with 50 parts by weight, per hundred of rubber, of a high abrasion furnace black, marketed under the registered trademark of Philblack O, and 2 parts by weight, per hundred of rubber, of 2,2'-dithio-bis-isobutyronitrile. By way of comparison, a sample omitting said 2,2'-dithio-bis-isobutyronitrile was also prepared. Compounding was done in the conventional manner on a roll mill. Both samples were cured in a press at 450° F. and tested by the conventional testing methods used for rubber.

|   | Parts by Weight | |
|---|---|---|
|   | 2A | 2B |
| SBR–1502 | 100 | 100 |
| Philblack O | 50 | 50 |
| 2,2'-dithio-bis-isobutyronitrile | 0 | 2 |

The following table shows the results of tests on the cured samples:

|   | Curing Time | 2A | 2B |
|---|---|---|---|
| Tensile, lb./in.² | 15' | 124 | 2,350 |
|   | 30' | 379 | 2,300 |
|   | 60' | 828 | 2,460 |
| Hardness, Shore Durometer | 15' | 36 | 56 |
|   | 30' | 47 | 57 |
|   | 60' | 53 | 59 |
| Modulus, lb./in.², at 300% extension | 15' | -------- | 2,190 |
|   | 30' | 320 | 2,150 |
|   | 60' | 370 | 2,460 |

Example 3

This example illustrates the usefulness of 2,2'-dithio-bis-isobutyronitrile as an accelerator for vulcanization by N-phenylmaleimide.

Additional samples were compounded as in Example 2, but with the inclusion of 4 parts by weight, per hundred of rubber, of N-phenylmaleimide, a crosslinking or vulcanizing agent. Compounding was done in the conventional manner on a roll mill.

|  | Parts by Weight | | |
|---|---|---|---|
|  | 3A | 3B | 3C |
| SBR-1502 | 100 | 100 | 100 |
| Philback O | 50 | 50 | 50 |
| N-phenylmaleimide | 4 | 0 | 4 |
| 2,2'-dithio-bis-isobutyronitrile | 0 | 2 | 2 |

After curing all samples in a press at 310° F. for 90 minutes, the following test results were obtained:

|  | 3A | 3B | 3C |
|---|---|---|---|
| Tensile, lbs./in.$^2$ | 402 | 158 | 2,165 |
| Hardness, Shore Durometer | 44 | 44 | 54 |
| Modulus, lb./in.$^2$ at 200% extension | 150 | 130 | 525 |
| Modulus, lb./in.$^2$ at 300% extension | 230 | 165 | 1,000 |

*Example 4*

This example illustrates the use of 2,2'-dithio-bis-isobutyronitrile as an accelerator for the N-phenyl-maleimide vulcanization of Paracril BJ, a synthetic rubbery copolymer of acrylonitrile and butadiene with an acrylonitrile content of about 20 percent. The Paracril BJ was compounded as in the preceding examples, but using 50 parts by weight, per hundred of rubber, of a carbon black marketed under the registered trademark of Spheron 6.

|  | 4A | 4B | 4C |
|---|---|---|---|
| Pacracril BJ | 100 | 100 | 100 |
| Spheron 6 | 50 | 50 | 50 |
| N-Phenylmaleimide | 4 | 0 | 4 |
| 2,2'-dithio-bis-isobutyronitrile | 0 | 2 | 2 |

All samples were cured in a press at 310° F. for 90 minutes, whereupon the vulcanizates gave the following test results:

|  | 4A | 4B | 4C |
|---|---|---|---|
| Tensile, lb./in.$^2$ | 41 | 57 | 1,300 |
| Hardness, Shore Durometer | 40 | 42 | 48 |
| Modulus, lb./in.$^2$ at 200% extension | 110 | 135 | 285 |
| Modulus, lb./in.$^2$ at 300% extension | 135 | 190 | 530 |

Having thus described my invention, what I claim and desire to protect by Letters Patent is:

1. 2,2'-dithio-bis-isobutyronitrile.
2. A process of forming 2,2'-dithio-bis-isobutyronitrile which comprises forming a mixture of 2,2'-azo-bis-isobutyronitrile and elemental sulfur in an inert organic solvent, heating the resulting solution up to a maximum temperature equal to the reflux temperature of said solution and subsequently recovering 2,2'-dithio-bis-isobutyronitrile.

References Cited in the file of this patent
UNITED STATES PATENTS

| 2,460,393 | Paul | Feb. 1, 1949 |
| 2,560,421 | Eby | July 10, 1951 |
| 2,700,659 | Carr | Jan. 25, 1955 |
| 2,762,836 | Selcer | Sept. 11, 1956 |
| 2,774,794 | Stewart | Dec. 18, 1956 |
| 2,993,037 | Heininger et al. | July 18, 1961 |

OTHER REFERENCES

Davies: C. A., 14 (1920), page 1968.
Stoner et al.: J.A.C.S., 63, (1941), pages 987–988.